United States Patent
Barnes et al.

(10) Patent No.: US 7,818,410 B1
(45) Date of Patent: Oct. 19, 2010

(54) SYSTEM AND METHOD OF IMPLEMENTING MAJOR APPLICATION MIGRATION

(75) Inventors: James D. Barnes, Overland Park, KS (US); Robert E. Urbanek, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1357 days.

(21) Appl. No.: 11/235,830

(22) Filed: Sep. 27, 2005

(51) Int. Cl.
*G06F 15/173* (2006.01)
(52) U.S. Cl. ...................................... 709/223; 709/226
(58) Field of Classification Search ................. 709/223, 709/226
See application file for complete search history.

(56) References Cited

U.S. PATENT DOCUMENTS

| | | | |
|---|---|---|---|
| 5,367,698 A * | 11/1994 | Webber et al. ............. 709/203 |
| 6,006,190 A * | 12/1999 | Baena-Arnaiz et al. ........ 705/1 |
| 6,219,654 B1 * | 4/2001 | Ruffin ........................ 705/400 |
| 6,725,451 B1 * | 4/2004 | Schuetz et al. .............. 717/151 |
| 2003/0055749 A1 * | 3/2003 | Carmody et al. .............. 705/28 |
| 2003/0182427 A1 * | 9/2003 | Halpern ...................... 709/226 |
| 2003/0188036 A1 * | 10/2003 | Chen et al. .................. 709/310 |
| 2004/0047354 A1 * | 3/2004 | Slater et al. ................. 370/400 |
| 2005/0033624 A1 * | 2/2005 | Dixon .......................... 705/8 |
| 2005/0125522 A1 * | 6/2005 | DelGaudio et al. .......... 709/223 |

* cited by examiner

*Primary Examiner*—Joon H Hwang
*Assistant Examiner*—Sherman Lin

(57) ABSTRACT

A method of managing migration in enterprise-computing systems is provided. The method includes inventorying information about each of a plurality of legacy servers and each of a plurality of applications, wherein the inventory information identifies the one or more applications installed on each of the legacy servers. The method includes defining a maximum number K of applications to migrate during a wave from the legacy servers to a plurality of preferred servers. The method also includes selecting a number Q of applications to migrate during the wave from the legacy servers to the preferred servers, where Q is less than or equal to K. The method further includes installing the Q applications on the preferred servers, and retiring the legacy servers whose applications have been migrated to the preferred server.

20 Claims, 5 Drawing Sheets

SYSTEM AND METHOD OF IMPLEMENTING MAJOR APPLICATION MIGRATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to a method for application migration, and more particularly, but not by way of limitation, to a system and method of information technology large-scale migration.

BACKGROUND OF THE INVENTION

Information technology (IT) systems in some enterprises may become massive and complex systems that incorporate a myriad of computer-based and non-computer-based entities. IT systems may include thousands of servers and applications to conduct business. The IT systems include some applications that may operate on one or more servers that include substantial operating costs. These servers may host one or more applications. Some servers in IT systems may employ proprietary Unix based operating system servers that may be more expensive to operate than non-proprietary PC based servers employing a Linux operating system.

SUMMARY OF THE INVENTION

According to one embodiment, a method of managing migration in enterprise computing systems is provided. The method includes inventorying information about each of a plurality of legacy servers and each of a plurality of applications, wherein the inventory information about every legacy server includes identifying each application installed on the legacy server. The method includes defining a maximum number K of applications to migrate during a wave from the legacy servers to a plurality of preferred servers. The method also includes selecting a number Q of applications, where Q is less than or equal to K, to migrate during the wave from the legacy servers to the preferred servers. The method further includes installing the Q applications on the preferred servers and retiring the legacy servers whose applications have been migrated to the preferred server.

In another embodiment, a method for retiring a plurality of legacy servers is also provided. The method includes determining, for each of a plurality of applications, the legacy servers that execute the application. The method includes determining, for each of the applications, a level of business criticality of the application and identifying, for each legacy server, the applications that execute on the legacy server. The method also includes identifying a lease expiration date of each of the legacy servers and identifying a maximum number K of applications to be selected for a current wave of application migration from the legacy servers to a preferred server. The method also includes selecting a number Q applications, wherein Q is less than or equal to K, for migration to the preferred server, the Q applications having a low level of business criticality, such that migrating the Q applications enables retirement of the maximum number of legacy servers. The method further includes migrating the Q applications to the preferred server and retiring the legacy servers whose applications have been migrated to the preferred server.

In still another embodiment, a computer-based tool is also provided. The computer-based tool includes an inventory of the legacy servers in an enterprise and the applications installed on the legacy servers. The inventory contains information about the legacy servers and the applications. The tool further includes an analyzer component operable to generate a prioritized list of applications for migrating from the legacy servers to a preferred server based on the inventory.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein.

As used herein, the term data store may refer to various computer-based storage systems, and/or applications such as relational databases, directories, and other storage systems. The term application may refer to a computer program or several cooperating computer programs. Multiple instances of an application may execute on a plurality of servers, for example to provide increased processing capacity.

Hosting applications on proprietary Unix based servers, for example SunOS, HP-UX, and AIX based servers, may involve substantially higher operating costs or ownership costs than non-proprietary PC based servers, for example Linux based PC servers. Because of the general similarity of the operating system environments of Unix based servers, migrating applications from proprietary Unix based servers to non-proprietary Linux based PC servers to save costs may be practicable. When a large number of applications are candidates for migration to lower cost servers, applications may be migrated in waves or cycles. The disclosure below provides methods or processes for identifying the applications to migrate during the next wave and/or in a succession of waves. In some of the embodiments discussed below the aim is to maximize the number of proprietary Unix based servers which are retired from service per wave or cycle, thereby maximizing the cost savings per wave.

The embodiments discussed below contemplate a system and method for retiring a plurality of legacy servers by migrating selected applications from the legacy servers to preferred servers, for example servers having lower costs. The method contemplates selecting applications to migrate to the preferred servers on a prioritized basis, to obtain benefit of greater cost savings. The method defers migrating critical applications until later, when knowledge of migration techniques has been increased and shared. The method also contemplates prioritizing applications such that migrating a fixed number of applications frees the maximum number of legacy servers for retirement, where the number of applications is based on the capabilities of a team to concurrently migrate applications.

Figure 1:
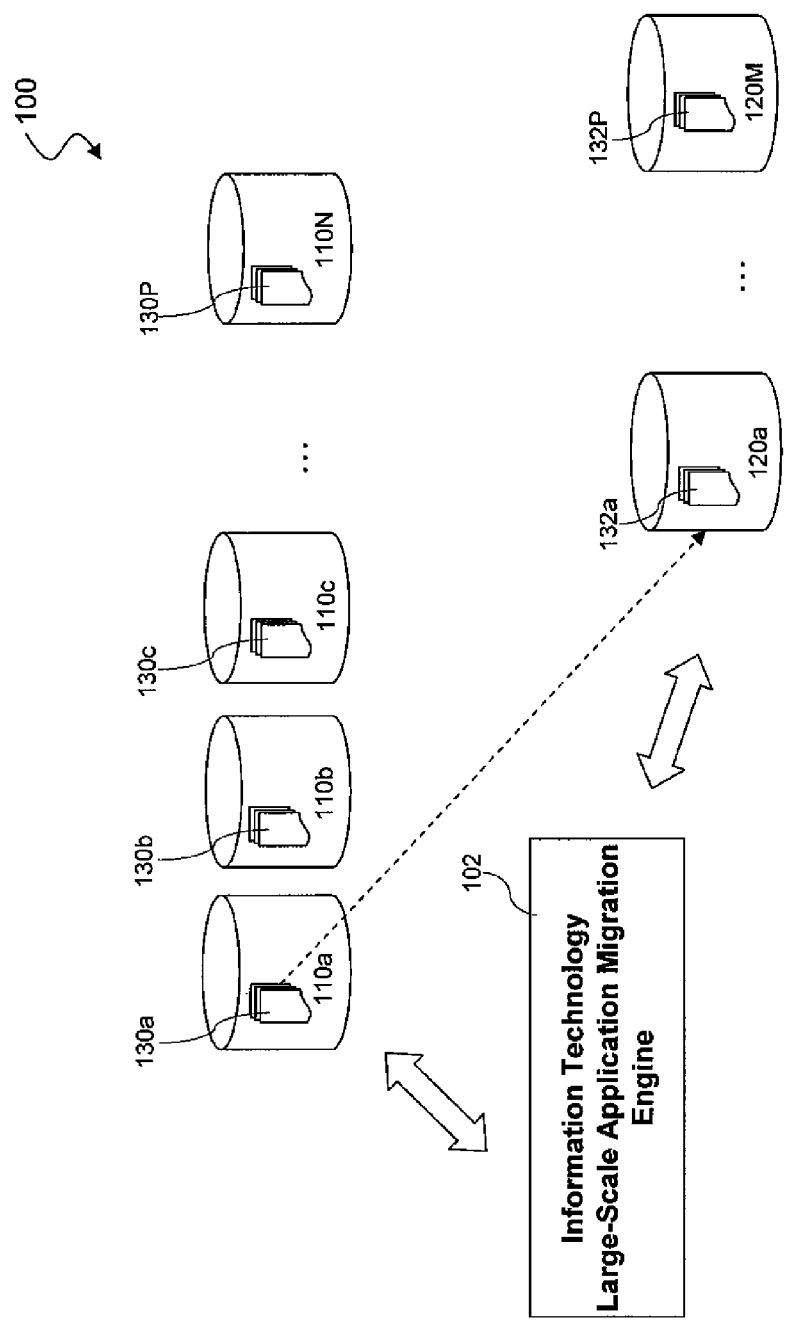
FIG. 1 is a block diagram of an embodiment of the present disclosure.

Turning now to FIG. 1, an information technology (IT) system 100 for migrating applications from a plurality of legacy servers 110 to a plurality of preferred servers 120 is depicted. The IT system 100 includes an application migration engine 102, the legacy servers 110a, 110b, 110c, . . . 110N, and the preferred servers 120a, . . . 120M. Note that the number of preferred servers 120 and the number of legacy servers 110 may not be the same. For example, the preferred servers 120 may provide either more or less processing power and hence, after all migration is completed, there may be fewer or more preferred servers 120 brought into service with respect to the number of legacy servers 110 retired from service. The application migration engine 102 (also referred to as a tool) interacts with the legacy servers 110, and the preferred servers 120.

In an embodiment, the IT system 100 may include one or more optional network(s) (not shown) forming an enterprise, which include one or more systems that are adapted for routing information and/or enabling communication between the legacy servers 110 and the preferred servers 120. The optional network(s) may include a telecommunication wired/wireless network, and/or other computer-based networked systems. The optional network(s) further include wired and/or wireless routing systems such as wireless base stations adapted for transmitting information over wireless radio frequency.

The legacy servers 110 and the preferred servers 120 are general-purpose computers. General purpose computers are discussed in detail hereinafter. The legacy servers 110 may operate using a different operating system as compared to the preferred servers 120. For example, some of the legacy servers 110 may employ a SunOS based operating systems, while the preferred servers 120 may employ a Linux based and/or other future operating system. A plurality of applications 130a, 130b, 130c, . . . 130P execute on the legacy servers 110 and provide desired processing functionality for the enterprise. In some cases, an application 130, for example a first application 130a, may execute on a plurality of legacy servers 110 to provide sufficient processing throughput. In other cases, an application 130 may execute on a single legacy server 110. In some cases, two or more applications 130 may execute on the same legacy server or servers 110, which may be referred to as stacking of applications.

In one embodiment, it is assumed that substantially the same functionality is provided by the respective applications independent of the server the applications 130 execute on, either the legacy servers 110 or the preferred servers 120. The preferred server 120 may provide a lower cost of ownership or a lower operating cost than the legacy server 110. The applications 130 may include single-tier, two-tier, three-tier, and/or other multiple-tier applications. In an embodiment, a three-tier application may include a web-tier application, a database-tier application, and an application-tier application. The applications 130 may also include container applications (i.e., applications that may be isolated from the operating system and/or that operate inside of another application, such as a commercial-off-the-shelf application). As examples, the applications 130 may include BEA WEBLOGIC, SUN ONE/IPLANET Web Server, INFORMIX Dynamic Server, IBM DB2, and/or other applications.

Applications 132a, . . . 132P execute on the preferred servers 120 and are substantially identical to the applications 130 that execute on the legacy servers 110. When migrating an application 130 from the legacy server 110 to the preferred server 120, the application 130 is considered to be transformed into the application 132. In some cases, the application 132 is identical to the application 130. In other cases, some minor changes may need to be made to the application 130 to make it suitable for execution on the preferred server 120 as the application 132, for example recompiling an application source using a compiler native to the preferred server 120. Some applications 130 may make calls to the native operating system of the legacy servers 110, and these applications 130 may require code changes in addition to being recompiled. Ordinarily after any code change, software should be retested, making migration of applications 130 with native operating system calls a more involved and troublesome activity.

In an embodiment, the application migration engine 102 (also referred to as an information technology large-scale application migration engine) may be supported by a team of technicians and/or developers. The application migration engine 102, in another embodiment, may also include one or more data stores, and/or other computer-based entities. The application migration engine 102 performs or assists in performing one or more instructions and/or actions for retiring the legacy servers 110. In an embodiment, the application migration engine 102 may also include one or more entities located within the optional network, and/or may include entities remote of the optional network. The application migration engine 102 may communicate with the optional network through wired and/or wireless methods.

In one embodiment, the application migration engine 102 includes one or more entities adapted for forming and maintaining a prioritized list of the legacy servers 110. The application migration engine 102 also includes an inventory 103 for listing and providing information associated with the properties of the applications 130 and the legacy servers 110. For example, in one embodiment, the application migration engine 102 may assist in identifying the operating system associated with each of the legacy servers 110. The application migration engine 102 may also assist in identifying information associated with server lease expiration dates and identifying the number of legacy servers 110 on which the applications 130 are installed. The application migration engine 102 may further assist in identifying a level of business criticality, and the extent of operating system dependencies of one or more of the applications 130.

The application migration engine 102 may also assist in eliminating legacy servers 110 that are not deemed candidates for replacement, for example because the operating system currently installed on the legacy servers 110 is not compatible with the operating system of the preferred servers 120, as for example MS Windows not being compatible with Linux. The application migration engine 102 may also include in the prioritized list the legacy servers 110 having an approaching server lease expiration date, such as within the next six months. The prioritized list may be employed for determining which of the legacy servers 110 include one or more of the applications 130 that migrate to one or more of the preferred servers 120. Based on the prioritized list, the application migration engine 102 also assists in forming one or more application migration waves including one or more of the applications 130 to the preferred servers 120.

It is to be understood that the application migration engine 102 may form the prioritized list(s) of the legacy servers 110 based upon criteria set forth by one or more users, and/or other computer-based entities. The application migration engine 102 may also form a prioritized list of the applications 130 associated with each one of the legacy servers 110.

A wave of application migration may include one or more of the applications 130 that may be migrated together to the preferred servers 120. In one embodiment, the application migration engine 102 includes an analyzer component 104 that identifies the maximum number of the applications 130 for which there is capacity for migration in one application migration wave. This number of applications can be referred to as K.

The application migration engine 102 might also assist in selecting the actual number of the applications 130 that will be migrated in a single wave. This number of applications can be referred to as Q. Q is less than or equal to K since the number of applications 130 that are actually migrated is less than or equal to the maximum number that might be migrated. The Q applications 130 may include applications 130 with a low level of business criticality.

A set of applications 130 that can be referred to as R can be defined such that migrating the R applications 130 enables retirement of the maximum number of the legacy servers 110 having an approaching lease expiration date.

A set of applications 130 that can be referred to as S can be defined such that S includes the commercial-off-the-shelf (COTS) software that is compatible with the preferred servers 120. Examples of COTS software include products produced by PEOPLESOFT and SAS.

A set of applications 130 that can be referred to as V can be defined such that V includes the applications 130 that execute in an environment provided by software from an independent software vendor. These applications may be referred to as container applications. An example of a container application would be an application based on Java 2 Enterprise Edition (J2EE) running in a J2EE-compliant application server, such as BEA WebLogic.

The analyzer component 104 of the application migration engine 102 may also assist in selecting a set T of the applications 130 for migration to the preferred servers 120. The T applications 130 are selected from low criticality applications such that the maximum number of the remaining legacy servers 110 may be retired. The analyzer component 104 of the application migration engine 102 may select the T applications 130 based upon the number of the legacy servers 110 that one or more of the applications 130 are installed on. That is, the stacking of applications on the legacy servers 110 may be considered in the selection of the T applications. For example, migrating an application that is running on a large number of servers may allow the retirement of a greater number of applications than migrating an application that is running on a small number of servers.

In an embodiment, Q=R+S+V+T. That is, the number Q of applications 130 that are to be migrated in a wave is equal to the number of applications 130 in the set R (applications that enable the retirement of the maximum number of the legacy servers 110 having an approaching lease expiration date), plus the number of applications 130 in the set S (COTS applications that are compatible with the preferred servers 120), plus the number of applications 130 in the set V (container applications), plus the number of applications 130 in the set T (applications that maximize the number of the remaining legacy servers 110 that may be retired).

It should be understood that the types of applications designated as R, S, V, and T are not necessarily mutually exclusive. For example, some S-type and/or V-type applications might also be R-type and/or T-type applications. Other forms of overlap among the application types will be apparent to one of skill in the art. Thus, Q could be considered to be equal to the number of applications in the set R plus the number of applications in the set S plus the number of applications in the set V plus the number of applications in the set T, less any duplicates.

It is understood that the application migration engine 102 may select the applications 130 having a high level of business criticality in later migration waves. For example, succeeding waves of application migration may include mission critical applications. The mission critical applications may be selected based upon a level of confidence. That is, after performing one or more waves of application migration, a level of confidence or experience may be achieved such that the team of technicians and/or developers may migrate one or more mission critical applications to one or more of the preferred servers 120, in an embodiment.

Figure 2A:
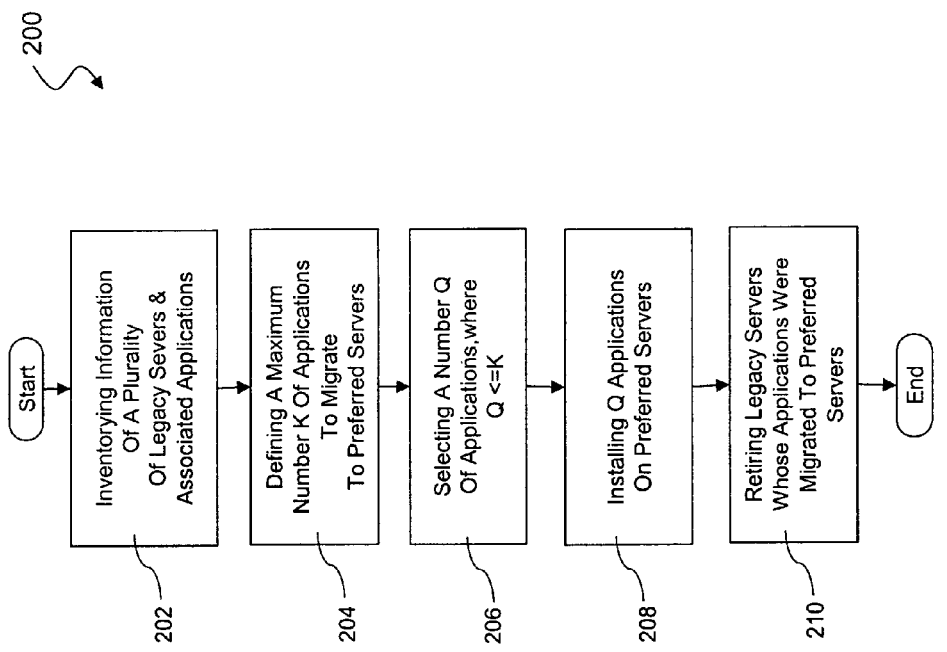
FIG. 2a is a flow diagram of one embodiment of a method for application migration according to aspects of the present disclosure.

Turning now to FIG. 2a, a flow diagram depicts a method 200 for maintaining enterprise computing systems. In an embodiment, the method 200 may be executed manually. Alternatively, the method 200 may operate through one or more computer-based entities of an enterprise computing system. In another embodiment, the method 200 may also operate in the application migration engine 102 of the IT system 100. In block 202, an inventory of the legacy servers 110 and the applications 130 is formed. The inventory of the legacy servers 110 and the applications 130 may include application type information, server data size (i.e., the storage size of one or more data stores attached to the legacy server), the business criticality of the applications 130, server lease expiration dates, service level agreements (SLA) (i.e., a level or understanding of quality thereof), and/or other associated information. The inventory may also identify the applications 130 that are COTS applications (such as Oracle DBMS) compatible with the preferred servers 120 or container applications for such COTS applications.

The method 200 proceeds to block 204 where a number K of the applications 130 is identified for a wave or cycle of application migration. K is the maximum number of the applications 130 that may be migrated from the legacy servers 110 to the preferred servers 120 in one wave of application migration. In an exemplary case, a team determined the maximum number of applications, i.e., the number K, they could migrate in one wave or cycle was 20 applications. Generally, K may be determined according to the available capacity, budget, and/or resources available for migrating one or more of the applications 130.

The method 200 proceeds to block 206 where a number Q of the applications 130 is selected such that Q is less than or equal to the maximum number K of the applications 130. This number Q may depend upon the size of team involved in the migration cycle, the skills of the team members, and the nature of the applications 130 to be migrated. For example, commercial-off-the-shelf (COTS) applications may be easy to migrate.

A set R of the applications 130 may be selected such that the maximum number of the legacy servers 110 are retired whose lease expiration date is near, for example the legacy servers 110 having lease expiration dates within the next six months. A set S of the applications 130 may include COTS applications. A set V of the applications 130 may include container applications. A set T of the applications 130 may include applications that maximize the number of the remaining legacy servers 110 that may be retired. As discussed previously, Q=the number of applications in the set R plus the number of applications in the set S plus the number of applications in the set V plus the number of applications in the set T, less any duplicates.

In another embodiment, the selection of the number Q of the applications 130 may include first selecting a number of applications 130 in the set R such that the maximum number of legacy servers 110 that have a server lease expiration date within the next six months are retired. The selection of the number Q of the applications 130 also includes selecting a number of applications in the set S such that the maximum number of the legacy servers 110 are retired, wherein the sum of the number of applications in the set R plus the number of applications in the set S, less any duplicates, is equal to Q. The selection of the number Q of the applications 130 next includes selecting a number of applications in the set V such that the maximum number of the legacy servers 110 are retired, wherein the sum of the number of applications in the set R plus the number of applications in the set S plus the number of applications in the set V, less any duplicates, is equal to Q. The selection of the number Q of the applications 130 further includes selecting a number of applications 130 in the set T such that the maximum number of legacy servers 110 are retired, wherein the sum of the number of applications in the set R plus the number of applications in the set S plus the number of applications in the set V plus the number of applications in the set T, less any duplicates, is equal to Q. This prioritization for selecting applications 130 for migration from the legacy servers 110 to the preferred servers 120 in a wave is exemplary. In earlier or later migration waves, other prioritization approaches may be followed.

A guiding concept behind this exemplary prioritization is to achieve substantially the greatest cost savings possible with a fixed set of migration resources, for example a fixed size team. The level of effort needed to migrate one application 130 is substantially constant, independent of how many legacy servers 110 the application 130 executes on. Thus it can be seen that, migrating an application 130a that runs in twenty legacy servers 110, wherein no other applications run in these twenty legacy servers 110, to preferred servers 120 provides more cost savings than migrating an application 130b that runs in one legacy server 110. Twenty legacy servers 110 can be retired from service when application 130a is migrated, but only one legacy server 110 can be retired from service when the application 130b is migrated to the preferred server 120.

As mentioned previously, the initial waves of application migration may include applications with a lower level of business criticality. After one or more waves of application migration are performed, a level of confidence or experience may be achieved such that the team of technicians and/or developers may migrate one or more mission critical applications to one or more of the preferred servers 120. That is, the actions in block 206 may be repeated as often as desired to include applications with increasing levels of business criticality.

The method 200 proceeds to block 208 where the number Q of the applications 130 are migrated to one or more of the preferred servers 120 where one or more of the applications 132 are formed. The migration of the number Q of applications 130 may include one or more code changes and/or other modifications. Some or all of the applications 130 may be recompiled using the compiler native to the preferred server 120. Engineers may make one or more code changes to the number Q of the applications 130. Some engineers may also perform tasks such as application installation, data backup, and/or data transfer of the number Q of the applications 130 to an external storage system and/or to one or more of the preferred servers 120. Other tasks involved in the migration may include testing and qualifying the Q applications 130 on one or more of the preferred servers 120.

The method 200 proceeds to block 210 where one or more of the legacy servers 110 are retired. One of the legacy servers 110 may not be retired if any application 130 continues to run on the legacy server 110. Thus, stacking of applications is a consideration in selecting applications for migration to free legacy servers 110 for retirement. Retired servers 110 may be removed from the enterprise or reallocated to other processing activities. Some legacy servers 110 may be returned to a leasor, in the event the legacy server 110 is leased. The method 200 then ends.

It is to be understood that the blocks 202 through 210 may be executed multiple times in order to retire the maximum number of the legacy servers 110. As successive waves of applications 130 are migrated to the preferred servers 120, the distributions of applications 130 running on legacy servers 110 having an approaching lease expiration date, of applications 130 that are COTS or container applications, and of applications that run on many legacy servers 110 can be expected to change. After completing several migration waves, the remaining applications may provide less cost savings. For example, in later waves the remaining applications may include many stacked applications which were passed over in earlier migration waves or applications running in only one or two legacy servers 110.

Figure 2B:
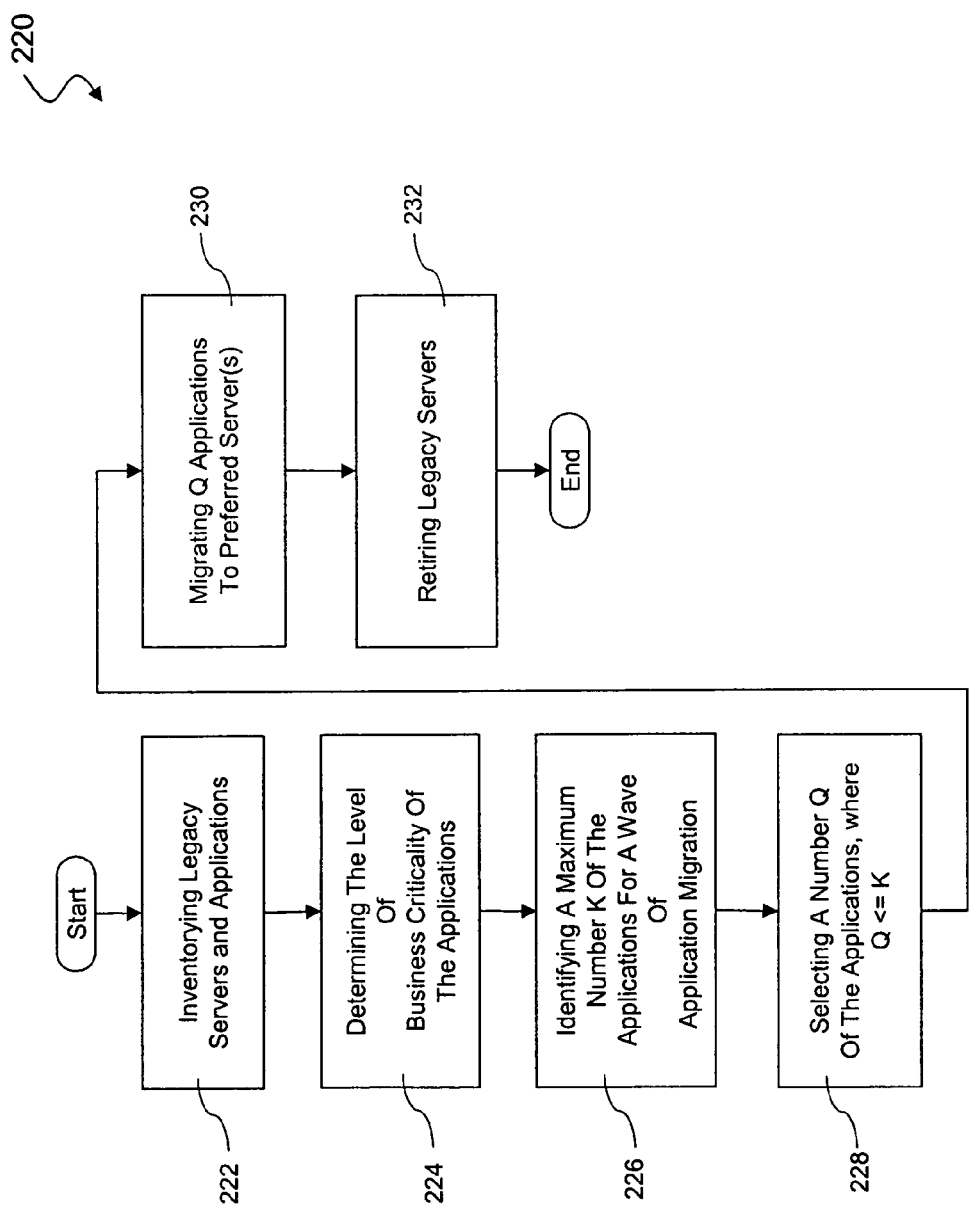
FIG. 2b is a flow diagram of an embodiment of a method for application migration according to another aspect of the present disclosure.

Turning now to FIG. 2b, a flow diagram depicts a method 220 for application migration. The method 220 may be executed manually. Alternatively, in another embodiment, the method 220 may operate in the application migration engine 102 of the IT system 100. The method 220 includes one or more aspects of the method 200, with the exception that the method 220 illustrates additional operations.

In block 222, an inventory of the legacy servers 110 and the applications 130 is completed. The inventory of the legacy servers 110 and the applications 130 may include application type information, server data size (i.e., the size of one or more data stores associated with the legacy servers), associated business criticality, server lease expiration dates, service level agreements (SLA) (i.e., a level or understanding of quality thereof), and/or other associated information. The inventory may identify the applications 130 that are container applications, such as BEA WEBLOGIC, and/or COTS applications, such as products produced by PEOPLESOFT or SAS.

The method 220 proceeds to block 224 where the level of business criticality of each of the applications 130 is determined. The level of business criticality of the applications 130 may be determined by technicians, and/or by one or more computer-based entities. For example, a high level of business criticality may be associated with "mission critical" applications, that is applications that may be critical for maintaining and operating vital portions of the IT system 100. A low level of business criticality is associated with applications that are not critical for maintaining and operating the IT system 100.

The method 220 proceeds to block 226 where a maximum number K of the applications 130 is identified for a wave of application migration. In an embodiment, the maximum number K may be determined according to an available budget and/or the resources available for migrating one or more of the applications 130. For example, the maximum number K may be based upon the ability of a team of technicians and/or developers to migrate a finite number of the applications 130 within a wave of application migration. For example, a team of technicians may migrate about twenty applications during one wave of application migration. The maximum number K may further include consideration of independent software vendor (ISV) application dependencies, code impacts due to operating system dependencies, and the return on investment of retiring the legacy servers 110.

The method 220 proceeds to block 228 where a number Q of the applications 130 is selected such that Q is less than or equal to K. The Q applications 130 may be selected such that the maximum number of the legacy servers 110 that have an approaching server expiration lease are retired. For example, in an embodiment, the Q applications 130 may execute on one or more of the legacy servers 110 having server lease expirations dates within the next six months. The Q applications 130 may also include a less than high level of business criticality, COTS applications, and/or container applications.

The method 220 proceeds to block 230 where the Q applications 130 are migrated to one or more of the preferred servers 120, where one or more of the applications 132 are formed. Migrating the Q applications 130 may involve making one or more code changes and/or other modifications. For example, a team of engineers may make one or more code changes to the Q applications 130. In an embodiment, some members of the team may also perform tasks such as data backup, and/or data transfer of the Q applications 130 to an external storage system and/or to one or more of the preferred servers 120. Other tasks involved in the migration may include testing and qualifying the Q applications 130 on one or more of the preferred servers 120. Some tasks involved in the migration of the Q applications 130 may include computer-based operations such as compiling code, transferring data, and/or other automated operations.

A number of applications 130 in the set V of container applications, that is, applications that function inside of a COTS software environment, may be selected for migration. A number of applications 130 in the set T of applications having a low level of business criticality may be selected such that the maximum number of the legacy servers 110 are retired. Application stacking of the applications 130 may also be considered in determining T, so that applications stacked on servers whose applications are already being migrated may get increased priority to completely free the shared stacked servers. The T applications 130 may be subsequently migrated to one or more of the preferred servers 120.

A number of applications 130 in the set S of applications that are COTS applications and that are available in a version compatible with the operating system of one or more of the preferred servers 120 may be selected and migrated to one or more of the preferred servers 120. A number of applications 130 in the set R may be selected such that the maximum number of the legacy servers 110 with approaching expiration dates are retired. Again, Q=the number of applications in the set V plus the number of applications in the set T plus the number of applications in the set S plus the number of applications in the set R, less any duplicates.

Next, the method 220 proceeds to block 232 where one or more of the legacy servers 110 are retired. In an embodiment, one or more of the legacy servers 110 may be retired if all of the applications 130 exist on one or more of the preferred servers 120. The retiring of the legacy servers 110 may include data transfer of other remaining data to one or more of the preferred servers 120. The retiring may also include operating one or more of the preferred servers 120 prior to retiring one or more of the legacy servers 110. For example, a corporate website may be maintained by one or more of the legacy servers 110. Due to business criticality, the corporate website preferably operates without interruption. Thus, one or more of the preferred servers 120 first operates the corporate website, then one or more of the legacy servers 110 are retired. The method 220 then ends.

Figure 2C:
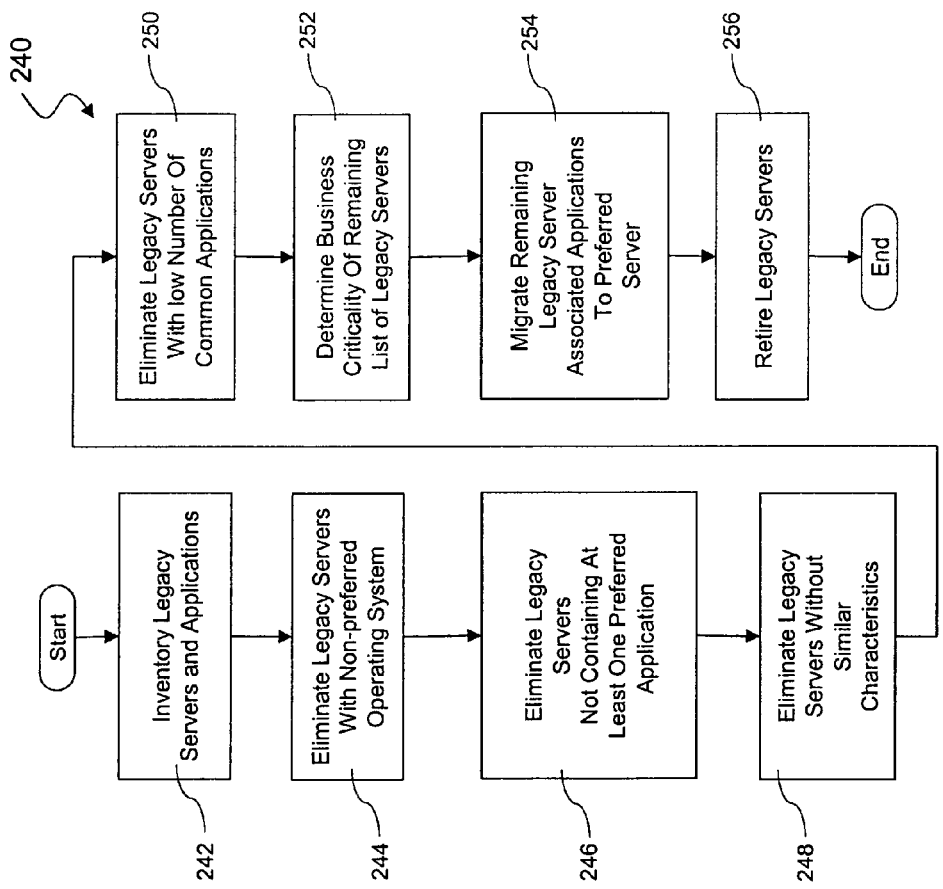
FIG. 2c is a flow diagram of an embodiment of a method for application migration according to another aspect of the present disclosure.

Turning now to FIG. 2c, a flow diagram depicts a method 240 for retiring the legacy servers 110. The method 240 may be executed manually. Alternatively, in another embodiment, the method 240 may operate in the application migration engine 102 of the IT system 100. The method 240 includes one or more aspects of the methods 200 and 220. The method 240 may also be employed for determining one or more waves of application migration of the applications 130 to the preferred servers 120.

In block 242, an inventory list of the legacy servers 110 and applications 130 is formed. The inventory list may include one or more of the legacy servers 110, with associated information such as application type information, server data size (i.e., the size of one or more data stores of the legacy server), associated business criticality, server lease expiration dates, and/or other associated information.

The method 240 proceeds to block 244 where the legacy servers 110 that employ operating systems that are incompatible with the operating system of the preferred servers 120 are eliminated from the inventory list. For example, the preferred servers 120 may include Linux based operating systems. The legacy servers 110 that are not based upon operating systems such as SunOS, HP-UX, and/or AIX may be eliminated from the inventory list.

In block 246, the legacy servers 110 that include applications 130 that are not preferred for migration are eliminated from the inventory list. These applications 130, for example, may be difficult to migrate because they make native calls to the operating system and may be less portable to the preferred server 120. These applications 130 may be selected in later migration waves. Legacy servers 110 that include applications 130 that run in containers, e.g., operating environments provided by independent software vendors, are good candidates for migration and are not eliminated in this step, provided the subject container application provides a version which runs in the operating system of the preferred server 120. Alternatively, the legacy servers 110 that do not include one or more components of systems and/or applications such as SUN ONE/IPLANET Web Server, BEA WEBLOGIC, ORACLE DBMS, INFORMIX Dynamic Server, and/or IBM DB2 may be eliminated from the inventory list.

In block 248, the legacy servers 110 that cannot be conveniently migrated to the preferred servers 120 are eliminated from the inventory list. The legacy servers 110 that include at least one or more characteristic of the preferred servers 120 may be deemed appropriate for application migration and retirement. The decision to deem appropriate the legacy servers 110 may be determined by a computer-based entity such as the application migration engine 102 and/or a user. In another embodiment, the legacy servers 110 having common infrastructure components, such as LDAP, security, and/or other components may be included in the list.

In block 250, the legacy servers 110 that include a low number of common applications are eliminated from the inventory list. A common application is an application existing on a high population of the legacy servers 110. For example, a high population of the legacy servers 110 may include a billing application. Therefore, the legacy servers 110 having the billing application may be included in the inventory list, in an embodiment.

In block 252, the level of business criticality of each one of the legacy servers 110 remaining in the inventory list are determined based upon the business criticality of one or more of the applications 130.

In an embodiment, for a first or early wave, the legacy servers 110 having one or more of the applications 130 with an associated lower level of business criticality may be selected for the inventory list. The applications 130 having the low level of business criticality may be selected for a first or early wave of application migration to the preferred servers 120.

In block 254, the compiled inventory list is used to designate for migration the applications 130 associated with the legacy servers 110 to the preferred servers 120. The inventory list determines a wave of application migration including the applications 130.

In block 256, the legacy servers 110 that are associated with the inventory list are retired. The preferred servers 120 include the applications 132a, . . . 132P, which may include one or more of the applications 130 that are selected according to block 242 through block 254. The method 240 then ends.

As discussed earlier, after one or more waves of migration, the distribution of remaining applications 130 executing on the legacy servers 110 can be expected to change. With increasing confidence in the team and process in the second or later waves, higher criticality applications may not be eliminated although the number in a given wave could be restricted in some embodiments. The migrations that provide the greatest gains with the least effort will typically be accomplished in the early waves. In an embodiment, the method 240 may be revised to continue to proceed from block to block eliminating legacy servers 110 from consideration, but halt when a minimum number of applications 130 installed on the legacy servers 110 in the list remain. These applications 130 may then be migrated to the preferred servers 120, the legacy servers 110 supporting these migrated applications 130 may be retired, and the method 240 may be reexecuted.

Figure 3:
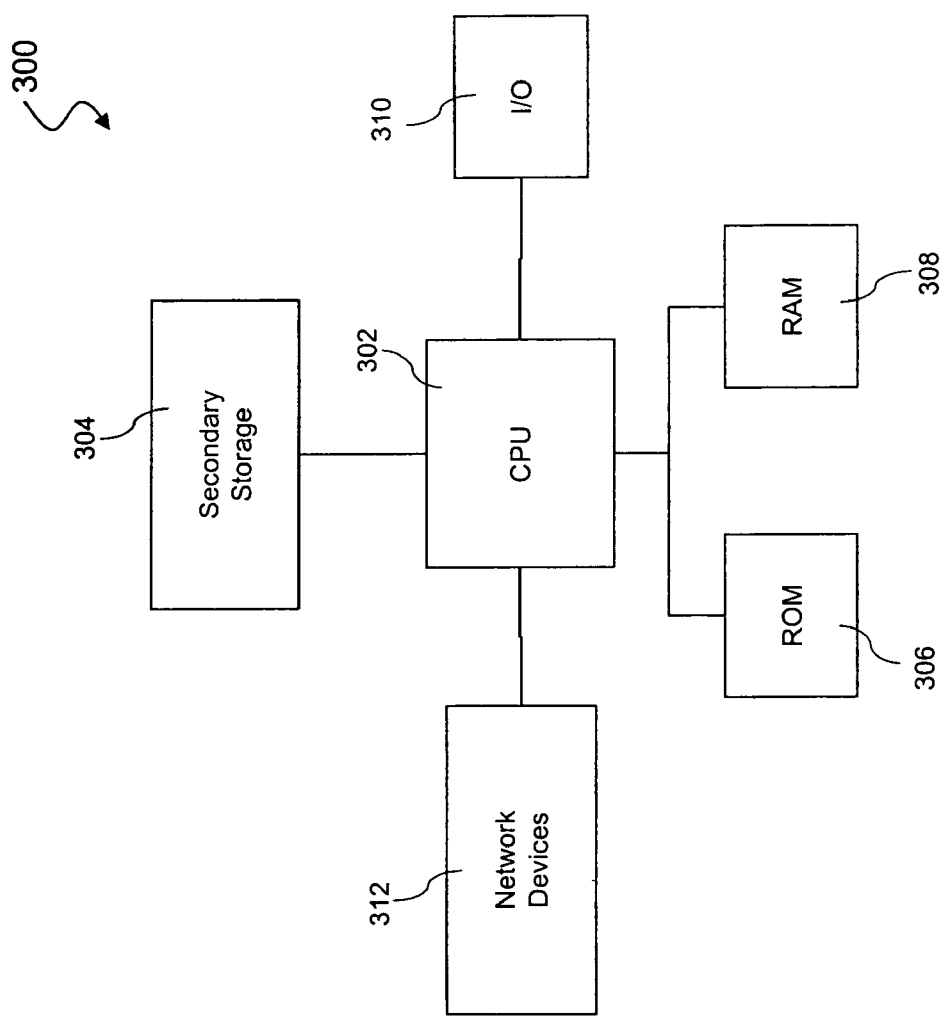
FIG. 3 illustrates an exemplary general-purpose computer system suitable for implementing the several embodiments of the present disclosure.

The system 100 described above may be implemented on one or more general-purpose computers with sufficient processing power, memory resources, and network throughput capability to handle the necessary workload placed upon it. FIG. 3 illustrates a typical, general-purpose computer system suitable for implementing one or more embodiments disclosed herein. The computer system 300 includes a processor 302 (which may be referred to as a central processor unit or CPU) that is in communication with memory devices including secondary storage 304, read only memory (ROM) 306, random access memory (RAM) 308, input/output (I/O) devices 310, and network connectivity devices 312. The processor 302 may be implemented as one or more CPU chips.

The secondary storage 304 is typically comprised of one or more disk drives or tape drives and is used for non-volatile storage of data and as an over-flow data storage device if RAM 308 is not large enough to hold all working data. Secondary storage 304 may be used to store programs, which are loaded into RAM 308 when such programs are selected for execution. The ROM 306 is used to store instructions and perhaps data, which are read during program execution. ROM 306 is a non-volatile memory device, which typically has a small memory capacity relative to the larger memory capacity of secondary storage. The RAM 308 is used to store volatile data and perhaps to store instructions. Access to both ROM 306 and RAM 308 is typically faster than to secondary storage 304.

I/O devices 310 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as Global System for Mobile Communications (GSM) radio transceiver cards, and other well-known network devices. These network connectivity devices 312 may enable the processor 302 to communicate with an Internet or one or more intranets. With such a network connection, it is contemplated that the processor 302 might receive information from the network, or might output information to the network in the course of performing the above-described method steps. Such information, which is often represented as a sequence of instructions to be executed using processor 302, may be received from and outputted to the network, for example, in the form of a computer data signal embodied in a carrier wave.

Such information, which may include data or instructions to be executed using processor 302 for example, may be received from and outputted to the network, for example, in the form of a computer data baseband signal or signal embodied in a carrier wave. The baseband signal or signal embodied in the carrier wave generated by the network connectivity devices 312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 302 executes instructions, codes, computer programs, scripts that it accesses from hard disk, floppy disk, optical disk (these various disk based systems may all be considered secondary storage 304), ROM 306, RAM 308, or the network connectivity devices 312.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A method of managing migration in enterprise computing systems, comprising:
    inventorying information about each of a plurality of legacy servers and each of a plurality of applications, the inventory information identifying one or more applications installed on each of the legacy servers;
    identifying a maximum number K of applications for which there is capacity for migration from the plurality of legacy servers to a plurality of preferred servers during each of a plurality of migration waves where K is less than a total number of applications to be migrated from the plurality of legacy servers to the plurality of preferred servers; wherein
    the identifying the maximum number K of applications is based on a determination of available budget and manpower resources;
    selecting a number Q of selected applications to migrate during a first one of the plurality of migration waves from the plurality of legacy servers to the plurality of preferred servers, where Q is less than or equal to K and where the number Q and the selected applications are based on the inventory information; wherein
    the selecting the Q applications comprises:
        first selecting a number of applications in a set R such that a maximum number of legacy servers that have a server lease expiration date within the next six months are retired, the number of applications in the set R less than or equal to K;
        second selecting a number of applications in a set S of commercial off-the-shelf applications such that a maximum number of legacy servers are retired, a sum of the number of applications in the set R plus the number of applications in the set S less than or equal to K;
        third selecting a number of applications in a set V of container applications such that the maximum number of legacy servers are retired, a sum of the number of applications in the set R plus the number of applications in the set S plus the number of applications in the set V less than or equal to K;
        fourth selecting a number of applications in a set T such that the maximum number of legacy servers are retired, a sum of the number of applications in the set R plus the number of applications in the set S plus the number of applications in the set V plus the number of applications in the set T less than or equal to K;
    migrating during the first one of the plurality of migration waves the selected applications from the plurality of legacy servers to the plurality of preferred servers;
    installing the selected applications on the plurality of preferred servers; and
    retiring the legacy servers whose applications have been migrated to the plurality of preferred servers.

2. The method of claim 1, wherein the selected applications are selected to maximize the number of retiring legacy servers.

3. The method of claim 1, wherein the inventory information about each legacy server includes a server lease expiration date and wherein the selected applications are selected to maximize the number of retiring legacy servers that have a server lease expiration date within a specified period of time.

4. The method of claim 1, wherein the inventory information about each application includes a level of business criticality and wherein the selected applications are selected from applications having less than a high level of business criticality.

5. The method of claim 1, wherein the selected applications are selected from applications which are commercial off-the-shelf applications supported by an operating system on at least one of the preferred servers.

6. The method of claim 1, wherein the selected applications are selected from applications which are container applications.

7. The method of claim 1, wherein the legacy servers employ operating systems that are selected from a group consisting of SunOS, HP-UX, and AIX.

8. The method of claim 1, wherein the preferred servers employ a Linux operating system.

9. The method of claim 1, wherein the plurality of legacy servers are a plurality of proprietary servers and the plurality of preferred servers are a plurality of non-proprietary servers.

10. The method of claim 1, wherein the selecting a number Q of selected applications to migrate during a first one of the plurality of migration waves is performed by an application migration engine stored as a set of computer readable instructions on a computer readable storage media and executable by a processor.

11. The method of claim 10, wherein the migrating during the first one of the plurality of migration waves the selected applications from the plurality of legacy servers to the plurality of preferred servers is performed by the application migration engine.

12. The method of claim 1, wherein K is determined further according to one of an available capacity, an available budget, and resources available.

13. The method of claim 1, wherein Q is determined based upon one of a size of a team involved in the first one of the plurality of migration waves and skills of team members.

14. A method for retiring a plurality of legacy servers, comprising:
    determining, for each of a plurality of applications, the legacy servers that execute each of the plurality of applications and information about the legacy servers;
    determining, for each of the plurality of applications, a level of business criticality of each of the plurality of applications;
    identifying, for each legacy server, the applications that execute on each legacy server;
    identifying a lease expiration date of each of the legacy servers;
    identifying a maximum number K of applications for which there is capacity for migration from the legacy servers to at least one preferred server in each migration wave of a plurality of migration waves; wherein
    the identifying the maximum number K of applications is based on a determination of available budget and manpower resources;
    selecting a number Q applications to migrate to the at least one preferred server based in part on the information about the legacy servers and the lease expiration date of each of the legacy servers, where Q is less than or equal to K, for migration to a preferred server in one of the plurality of migration waves, the Q applications having a low level of business criticality, such that migrating the Q applications enables retirement of a maximum number of legacy servers;

the selecting the Q applications further comprises:
  selecting for migration to the preferred server a number of applications in a set R, the R applications having lease expiration dates before a scheduled next wave of application migration, where the number of applications in the set R is less than or equal to Q;
  selecting for migration to the preferred server a number of applications in a set V of applications that function inside of a commercial off-the-shelf software environment, where the number of applications in the set R plus the number of applications in the set V is less than or equal to Q;
  selecting for migration to the preferred server a number of applications in a set S, the S applications being commercial off-the-shelf applications available in a version compatible with an operating system of the preferred server, where the number of applications in the set R plus the number of applications in the set V plus the number of applications in the set S is less than or equal to Q;
  selecting for migration to the preferred server a number of applications in a set T such that a maximum number of remaining legacy servers can be retired, the T applications having a low level of business criticality, where the number of applications in the set R plus the number of applications in the set V plus the number of applications in the set S plus the number of applications in the set T is less than or equal to Q;
  migrating during the one of the plurality of migration waves the Q applications to the preferred server; and
  retiring the legacy servers whose applications have been migrated to the preferred server.

15. The method of claim 14, wherein Q is less than K, further comprising
  migrating during the one of the plurality of migration waves the R applications to the preferred server.

16. The method of claim 15, wherein Q is less than K, further comprising
  migrating during the one of the plurality of migration waves the V applications to the preferred server.

17. The method of claim 16, wherein Q is less than K, further comprising
  migrating during the one of the plurality of migration waves the S applications to the preferred server.

18. The method of claim 17, wherein Q is less than K, further comprising
  migrating during the one of the plurality of migration waves the T applications to the preferred server.

19. The method of claim 18, wherein application stacking is considered in determining if a legacy server can be retired.

20. The method of claim 14, wherein migrating applications having a high level of business criticality and migrating applications making native operating system calls are deferred until a later wave of application migration.

* * * * *